(12) United States Patent
Richardson (10) Patent No.: US 9,052,874 B2
(45) Date of Patent: Jun. 9, 2015

(54) HANDHELD DEVICE WITH A USER INTERFACE

(75) Inventor: Nigel Richardson, Surrey (GB)

(73) Assignee: Nokia Technologies Oy, Espoo (FI)

( * ) Notice: Subject to any disclaimer, the term of this patent is extended or adjusted under 35 U.S.C. 154(b) by 1372 days.

(21) Appl. No.: 12/291,877

(22) Filed: Nov. 14, 2008

(65) Prior Publication Data

US 2010/0123646 A1 May 20, 2010

(51) Int. Cl.
*G09G 5/00* (2006.01)
*G06F 1/16* (2006.01)
*H04M 1/02* (2006.01)

(52) U.S. Cl.
CPC ............ *G06F 1/1679* (2013.01); *G06F 1/1616* (2013.01); *G06F 1/1647* (2013.01); *G06F 2200/1614* (2013.01); *H04M 1/022* (2013.01); *H04M 2250/16* (2013.01); *G06F 1/162* (2013.01)

(58) Field of Classification Search
CPC .............. G09G 2300/02; G09G 2300/023; G09G 2300/026; G06F 1/1679; G06F 1/1616; G06F 1/1647; G06F 2200/1614; H04M 1/022; G04M 2250/16
USPC ........ 345/1.3, 156–184, 1.1–3.4; 40/421–425
See application file for complete search history.

(56) References Cited

U.S. PATENT DOCUMENTS

| | | | |
|---|---|---|---|
| 5,494,447 A * | 2/1996 | Zaidan .............................. | 439/31 |
| 5,936,619 A * | 8/1999 | Nagasaki et al. ............. | 345/205 |
| 6,266,236 B1 | 7/2001 | Ku et al. ........................ | 361/681 |
| 7,916,473 B2 * | 3/2011 | Jang .......................... | 361/679.55 |
| 8,306,584 B2 * | 11/2012 | Yeh et al. ..................... | 455/575.4 |
| 8,412,279 B2 * | 4/2013 | Griffin et al. ................. | 455/566 |
| 2002/0077161 A1 | 6/2002 | Eromaki ........................ | 455/575 |
| 2003/0125081 A1 | 7/2003 | Boesen ......................... | 455/556 |
| 2003/0142469 A1 | 7/2003 | Ponx .............................. | 361/683 |
| 2004/0212956 A1 * | 10/2004 | Kuivas et al. .................. | 361/683 |
| 2005/0085273 A1 | 4/2005 | Khalid et al. ................. | 455/566 |
| 2006/0012951 A1 * | 1/2006 | Kim ................................ | 361/681 |
| 2006/0029218 A1 | 2/2006 | Lu et al. ................... | 379/433.13 |
| 2006/0148543 A1 | 7/2006 | Hunt .......................... | 455/575.4 |
| 2006/0264243 A1 | 11/2006 | Aarras .......................... | 455/566 |
| 2007/0243896 A1 * | 10/2007 | Maatta et al. .............. | 455/550.1 |
| 2008/0024388 A1 * | 1/2008 | Bruce ............................. | 345/1.1 |
| 2008/0232054 A1 | 9/2008 | Chen et al. .................... | 361/681 |
| 2009/0286574 A1 * | 11/2009 | Kim et al. ...................... | 455/566 |
| 2010/0144408 A1 * | 6/2010 | Chuang et al. ............. | 455/575.4 |

FOREIGN PATENT DOCUMENTS

| | | |
|---|---|---|
| EP | 1 699 208 A1 | 10/2004 |
| EP | 1 589 728 A1 | 10/2005 |

(Continued)

*Primary Examiner* — Jonathan Horner
(74) *Attorney, Agent, or Firm* — Harrington & Smith (57) ABSTRACT

A handheld device has a first body part with a first user interface element and a second body part with a second user interface element, and a link mechanism configured to interconnect the first body part and the second body part movably by a user between a first configuration and a second configuration. The first body part and the second body part being stacked in a first order in the first configuration and in a second order opposite to the first order in the second configuration. Each body part has a user interface on its upper surface so that either one can be exposed to a user by changing between the first and second configurations.

21 Claims, 5 Drawing Sheets

(56) References Cited

FOREIGN PATENT DOCUMENTS

| EP | 1 858 235 A1 | 11/2007 |
|----|--------------|---------|
| GB | 2 448 981 A | 11/2008 |
| WO | WO-2008/058556 A1 | 5/2008 |
| WO | WO 2008/058556 A1 | 5/2008 |
| WO | WO-2008056019 A1 | 5/2008 |

* cited by examiner

HANDHELD DEVICE WITH A USER INTERFACE

FIELD OF THE INVENTION

The present invention generally relates to a handheld device with a user interface. The invention relates particularly, though not exclusively, to a handheld device with a retractable user interface.

BACKGROUND OF THE INVENTION

Mobile phones, cordless phones, portable game devices, personal digital assistants (PDA) and remote controllers each need a user interface in order to receive input from a user and to present information to the user. Remote controllers and cordless phones are typically stored in a household, while pagers, PDA devices and mobile phones are mobile devices which are typically made to be easily pocketable. However, mobile device that is well-suited for pocketing by a user is not large enough to house displays that are convenient for sustained use. A small display suffices well to check a phone number from a pager or to read a short message, but does not necessarily enable comfortable reading of web pages, for example.

Clam-shell formed mobile phones typically have a main display underneath a lid and a keypad on top of a body on which the lid rests when folded to a closed position. Hence, neither the keypad nor the main display is visible when the lid is closed. A secondary display is therefore often provided on the top of the lid in order to enable presenting of information while the lid rests on the body. A clam-shell form-factor thus prevents using a common display both in the closed and open configurations.

Sliding cover is an alternative to a clam-shell form factor. A slide enables maintaining a movable display visible to the user while exposing a keypad from underneath of the slide. Hence, a secondary display is not needed. However, mobile phones with slides do not expose the whole of the bottom part under the slide. Typically, a fully opened sliding cover still overlaps the body under the slide by more than one half of the length of the phone.

SUMMARY

According to a first exemplary aspect of the invention there is provided a handheld device comprising:
- a first body part comprising a first user interface element;
- a second body part comprising a second user interface element;
- a link mechanism configured to interconnect the first body part and the second body part movably by a user between a first configuration and a second configuration;
- the first body part and the second body part being stacked in a first order in the first configuration and in a second order opposite to the first order in the second configuration.

The first and second body parts may each have thickness substantially smaller than width and length. The first and second body parts may each have differing widths and lengths.

The first and second parts may each be configured to maintain its orientation when the first and second parts are moved between the first and second configurations.

The first part and of the second part may be configured to maintain their orientation throughout changing from the first configuration to the second configuration.

The link mechanism may be configured to provide a third configuration between the first and second configuration such that the first body part and the second body parts are positioned sequentially.

The first and second body parts may be located in a common plane in the third configuration.

The link mechanism may comprise two arms spaced apart of each other. At least one of the arms may comprise orientation control equipment configured to control the orientation of the first and second body parts during change between the first and second configuration.

The device may further comprise orientation control equipment at two opposite sides of the device. The device may further comprise a force transmission system configured to link the orientation control equipment at the two opposite sides so as to reduce twist between the two bodies.

The link mechanism may comprise one pivot point at each of the first and second body parts; a shaft; and gears connecting the shaft to the first and second body parts at the respective pivot points.

The device may further comprise a processor and a memory configured to store instructions for the processor.

The processor may be configured to provide different services according to instructions stored in the memory. The processor may be configured to process different services selectively depending on the configuration of the body parts.

The first and second body parts may each comprise a first display and a second display, respectively. The displays may be functionally connected to the processor.

The first and second displays may be assigned at a given time to respective first and second services and the processor is configured to select as currently operated service the service corresponding to the display that is stacked on top of the remaining display.

According to a second exemplary aspect of the invention there is provided a handheld device comprising:
- a first body part comprising a first user interface element;
- a second body part comprising a second user interface element;
- means for interconnecting the first body part and the second body part movably by a user between a first configuration and a second configuration;
- the first body part and the second body part being stacked in a first order in the first configuration and in a second order opposite to the first order in the second configuration.

According to a third exemplary aspect of the invention there is provided a computer program embodied in a physical memory medium for controlling a handheld device that comprises a first body part and the second body part with respective displays and connected such that the first and second body parts are stackable in reversible order, the program comprising:
- computer executable program code configured to cause the handheld device to present first content on the first body part and no content on the second body part when the device is in the first configuration;
- computer executable program code configured to cause the handheld device to present no content on the first body part and second content on the second body part when the device is in the second configuration; and
- computer executable program code configured to cause the handheld device to present third content on the first body part and fourth content on the second body part when the device is in the first configuration.

The third content may correspond to the first content and the fourth content may correspond to the second content.

The first and second contents may be independent of each other; and the third content and the fourth content may collectively represent common content.

Any foregoing memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

Different non-binding exemplary aspects and embodiments of the present invention have been illustrated in the foregoing. Some embodiments may be presented only with reference to certain exemplary aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
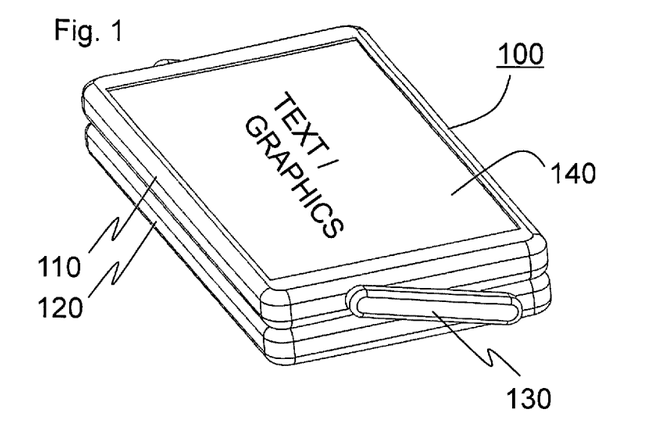
FIG. 1 shows a view of an apparatus according to an embodiment of the invention in a first configuration.
Figure 2:
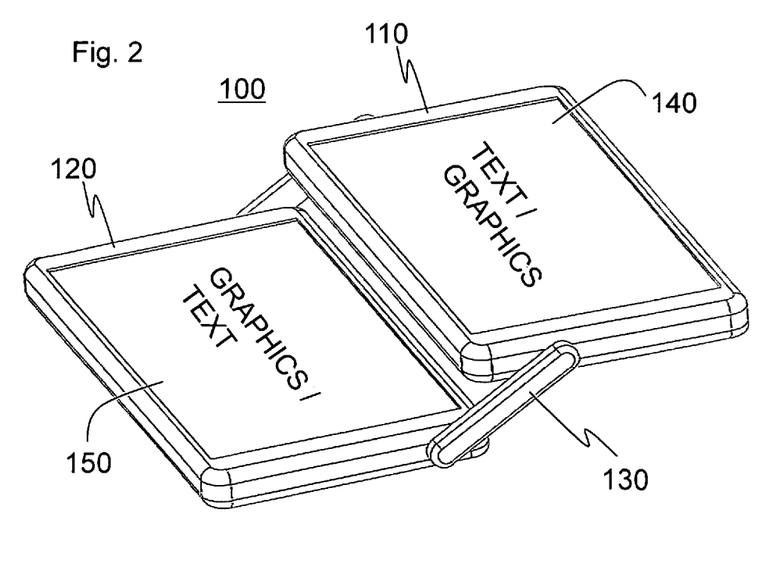
FIG. 2 shows a view of the apparatus of FIG. 1 in an intermediate configuration.

FIG. 1 shows a view of an apparatus 100 according to an embodiment of the invention in a first configuration. The apparatus 100 comprises two body parts, that is a first body part 110 aligned onto a second body part 120 and interconnected by means of a link mechanism 130 that enables the first and second body parts to move in relation to one another between the first configuration shown in FIG. 1 and the second configuration shown in FIG. 3 via different intermediate configurations, two of which is shown in FIGS. 2 and 4. The link mechanism may be constructed by means of two separate or commonly formed arms, for instance. Forming two arms of a single part may improve perceived quality of movement and reduce the amount of twist in the link mechanism.

Each body part may be formed of a one or more parts of plastics, metal, wood, glass, stone or other natural or synthetic fibers. The body parts may generally provide a frame for carrying other elements as will be appreciated from the following description.

Figure 5:
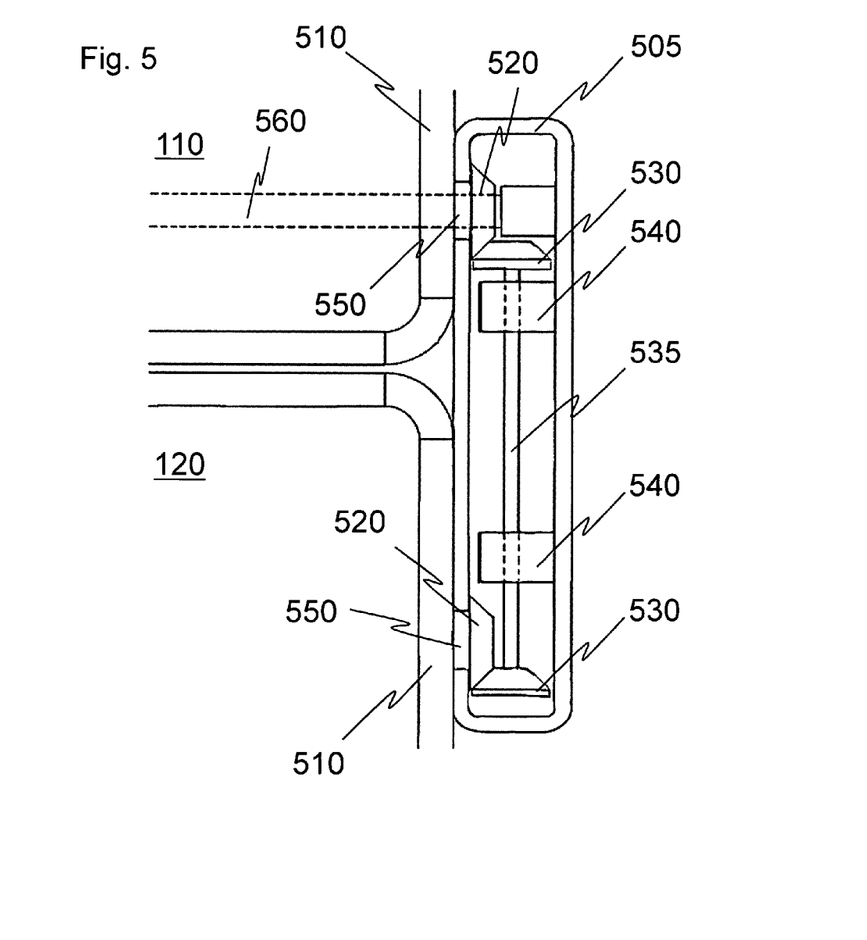
FIG. 5 shows a planar view on particular details of the apparatus of FIG. 1.
Figure 6:
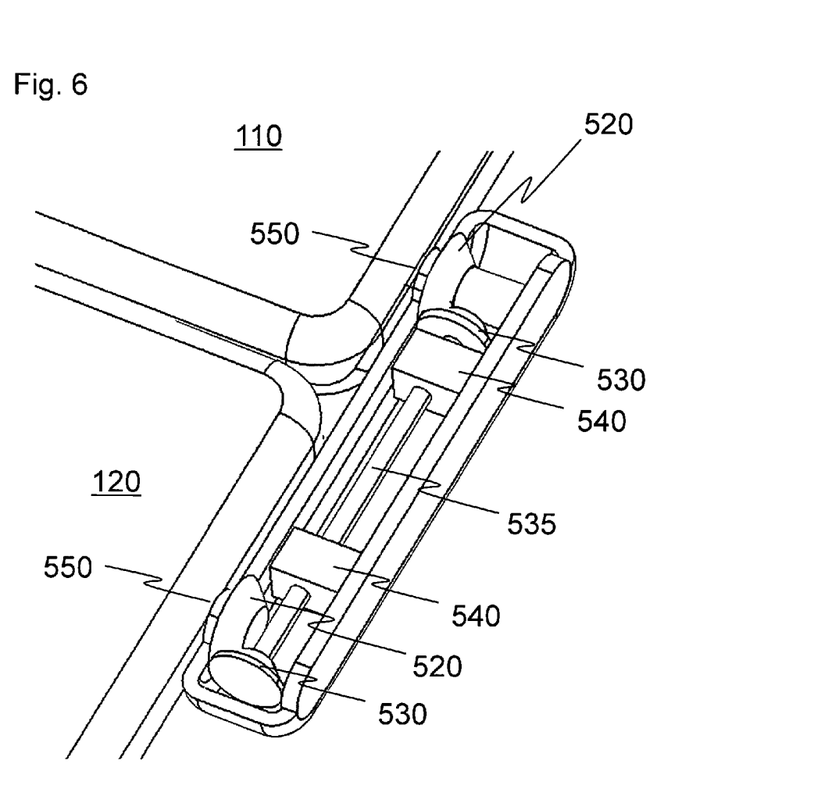
FIG. 6 shows a perspective view on particular details of the apparatus of FIG. 1.

An example of the structure of the link mechanism 130 is described with further detail in connection with FIGS. 5 and 6. Generally the link mechanism may be configured to permit rotational movement of the body parts 110, 120 relative to the link mechanism 130 and control the limits of movement. The rotational movement of the body parts 110, 120 may also be relative to each other and to arms of the link mechanism 130.

The first body part 110 comprises a first user interface i.e. in this example a first display 140 configured to present information to a user. The first display 140 may comprise an abrasion resistant window or coating so as to endure some wearing that the display on the outer side of the apparatus 100 faces, for example, when placed in a bag or in a pocket of trousers or of a coat.

The apparatus 100 may further comprise an intercommunication circuitry for permitting the two body parts 110, 120 to communicate with each other. The intercommunication circuitry may comprise contacting or contact free communication link. The communication link may comprise, for example, contacts at each body part 110, 120 for engaging with each other to pass electric or optical signals, a connector through either or both arms 130, a local radio communication system and/or an infrared light link, for instance.

FIG. 2 shows a view of the apparatus 100 of FIG. 1 in an intermediate configuration in which the apparatus is being adapted from the first configuration (FIG. 1) towards a third configuration (FIG. 4). FIG. 2 illustrates that the body first and second body parts 110, 120 are kept in parallel while the body parts are being aligned sequentially or into a common plane as shown in FIG. 4. The parallel orientation may be maintained by means of the link mechanism 130 such that a user may handle the apparatus 100 with a single hand as if it were made of a single part.

Figure 3:
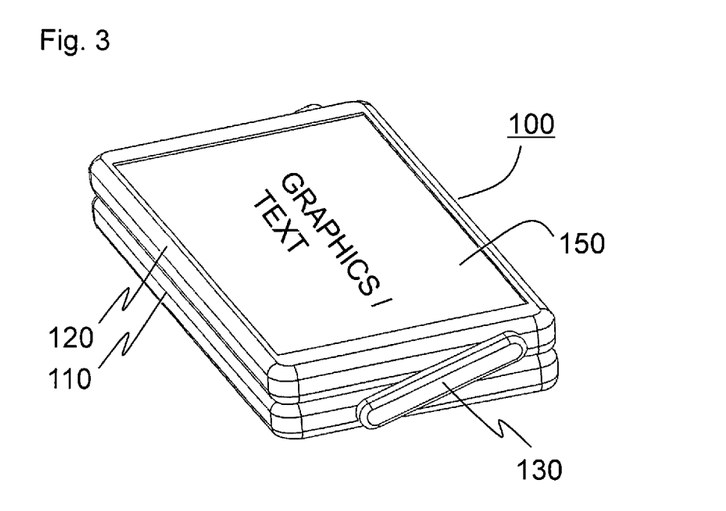
FIG. 3 shows a view of the apparatus of FIG. 1 in a second configuration.
Figure 4:
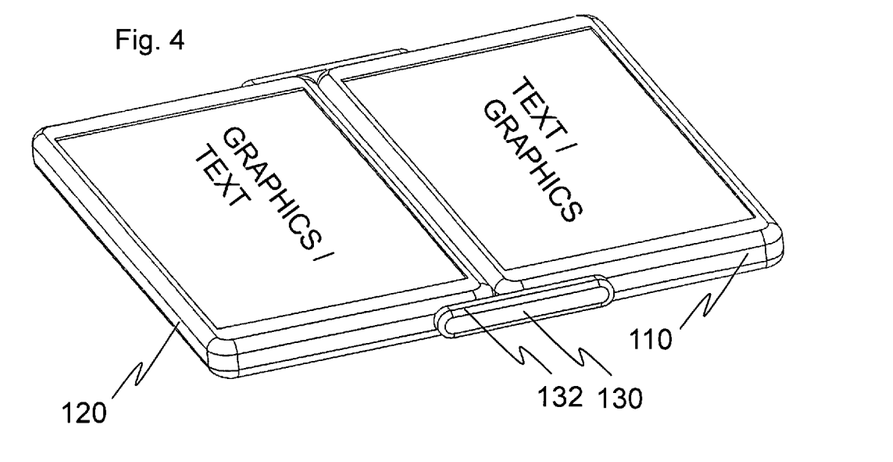
FIG. 4 shows a view of the apparatus of FIG. 1 in a third configuration.

FIG. 3 shows a view of the apparatus 100 of FIG. 1 in a second configuration. In this drawing, the second body part and respectively a second user interface i.e. here a second display 150 resides on top of the apparatus 100. The second display 150 may differ from the first display 140 such that one display (e.g. second display 150) is a touch screen that enables direct interaction with a user but is more prone to scratching. This configuration may be particularly suited for portable user input entry through a touch screen, while the first configuration may be used for transportation and storage of the apparatus 100 and the third configuration for extended user interface e.g. for web browsing, playing games or accessing different office application documents e.g. worksheets, presentations and word processing documents.

FIG. 4 shows a view of the apparatus of FIG. 1 in a third configuration, as mentioned already in the foregoing. The apparatus 100 may be configured to snap to this configuration. The snap may be implemented by means of a mechanism in the link mechanism 130 and/or by a latch or magnetic restraint located at abutting ends of the first and second body parts (not shown). Moreover, the side of one body part may be concave and the other convex, and the apparatus 100 may be configured to bias the engaging sides so as to restrain the body parts from passing each other. The bias may be provided by a biasing element within the link mechanism 130, affecting to the connection of the link mechanism 130 in either or both ends, and/or by forming either or both sides of the apparatus resilient such that the link mechanism need not stretch or move but the sides of the apparatus provide a resiliently compressible contact surface.

FIG. 4 further illustrates that the first display 140 remains upwards i.e. towards a viewer when moved from the first configuration to the third configuration and also when in the second configuration of FIG. 3, while the first display is concealed by the second body part in the second configuration. Hence, the operation of the displays during transfer from one configuration to another is very intuitive and straightforward to a user.

FIG. 4 displays the content on the first and second displays 140 and 150, respectively, as unchanged in comparison to the first and second configurations. Alternatively, the third configuration may turn the content on the displays such that the direction of use of the device turns by 90 degrees. Alternatively the third configuration may turn the content of one of the displays so it is 180 degrees relative to the content on the other display. In this configuration 2 users could view content/interact with the device whilst facing each other. Such an arrangement may be used in a conference phone, for instance. Further, the apparatus may be configured to automatically rotate its displayed image according to the orientation of the apparatus with relation to the user or to the gravitational field of the earth. Modern display elements have ever smaller edge regions and in some applications the two displays may be used as one extended display in which the content extents from one screen to another. Thus, it may be possible to provide a user interface area that is completely flat for allowing the two displays to form a large contiguous or coherent display.

FIG. 4 further designates an upper arm cover 132 that is a part of the link mechanism 130.

FIG. 5 shows a planar view on particular details of the apparatus 100 of FIG. 1. FIG. 5 shows an arm chassis 505 opened up by removing an upper arm cover 132 (see FIG. 1) Within the arm chassis 505, there is body gear wheel 520 fixed to a body part or more particularly to a cover 510 of the body part at a pivot point 550. The body gear wheel 520 is coupled to a transmission gear wheel 530 that is linked via an arm shaft 535 to another end of the arm at which there is a corresponding gear system. The arm shaft 535 is supported to the arm by means of bearings 540. FIG. 5 further shows an arm connector shaft 560 that is e.g. a rigid axis configured to rigidly link movement of arm chassis 505 to an opposite arm in case that the body part 110 would twist on moving between different configurations. The gears may be e.g. bevel gears, helical gears, or double helical gears.

The arms and bodies may also include means of reducing friction between the parts based on material properties, gear dimensioning, mechanical structures and/or additional components such as a battery operated actuator or a resilient movement facilitator. For instance, the apparatus may be configured to assume a stacked configuration when compressed with a force against the resilient movement facilitator which then drives the body parts towards the third configuration. More generally, the apparatus may be configured to change from one configuration automatically by means of previously reserved energy from the user or by using its own power source.

In order to protect the gears from excessive force, the geometry of the gears may be suitably selected and the gears be resiliently loaded such that a force beyond a given threshold enables the gears to jump to different positions. This may also enable a user to set an arbitrary angle between the body parts e.g. to support the displays in a desired angle for convenient viewing or clear sound production.

FIG. 6 shows a perspective view on particular details of the apparatus of FIG. 1. The parts in FIG. 6 have already been described in connection with FIG. 5.

It is appreciated that the link mechanism 130 may permit three or more modes of operation where the arms and bodies are held in stable positions relative to each other. Different types of user interfaces may be revealed in these different modes.

It is appreciated that orientation control equipment may be provided for synchronizing the movement of the two bodies relative to each other so that the one user interface area remains in a common plane. The synchronizing may work in the following manner:

Each body has a large bevel gear fixed to it; the gear is rigidly fixed, i.e. it does not rotate relative to the body part. The arm linking the two body parts contains a shaft with a gear at either end; the shaft and gears are able to rotate along the axis of the shaft in bearing surfaces in the arm chassis. The arm chassis is fixed into an upper and lower cover. These cover parts provide the main bearing surfaces for the arm/body part interface. A shaft passes through one of the pivot points to connect the arm with one on the opposite end of the device. Connecting the two arms by the shaft reduces twist in the complete mechanism. The arm on the other side of device may be used to route electrical connections between the two body parts. As the user moves the body parts relative to each other the arms allow movement about the pivot points. The gears in the arm link the movement of one body part to the other as they move around the circumference of the large gears in each body part.

The orientation control equipment may additionally or alternatively comprise an electric, pneumatic or hydraulic orientation control circuitry.

Figure 7:
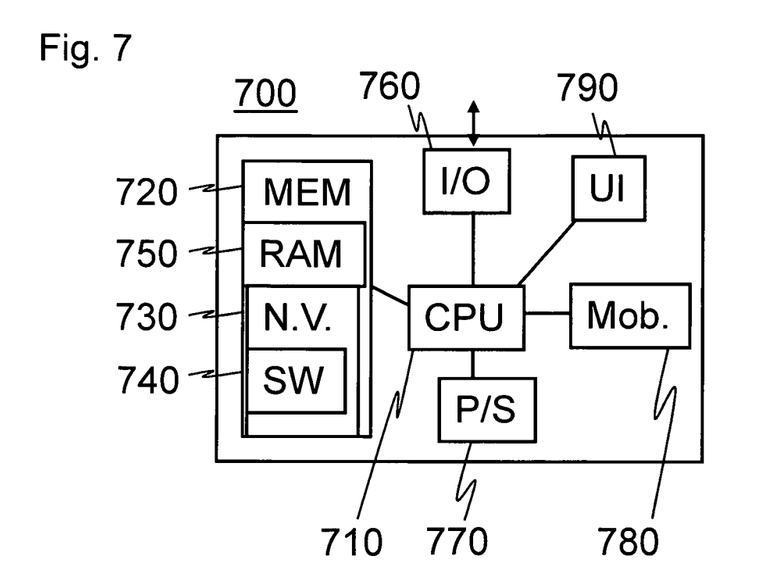
FIG. 7 shows a block diagram of an apparatus according to an embodiment of the invention.

FIG. 7 shows a block diagram of an apparatus 700 according to an embodiment of the invention. FIG. 7 shows a processor 710, a memory 720 with a work memory 750 and non-volatile memory 730 including software 740 and a local communication unit 760. The processor 710 may be a microprocessor, a master control processor, a digital signal processor, for instance. The processor is configured to control the general operation according to instructions provided by the software 740 by executing the software in the work memory 750. In an alternative embodiment, the processor is configured to execute in place the software, in which case separate work memory may not be needed for executing the software 740. The local communication unit 760 may be provided for local information transmission and/or reception with proximate devices. The local communication unit may support any one or more of local area network communications, infrared communications or more generally optical communications, ultrasound or more generally acoustic communications, short range radio communications such as Bluetooth or wireless local area network communications, and universal serial bus. The memory 720 may comprise a static random access memory (SRAM), a dynamic random access memory (DRAM), an Erasable Programmable Read-Only Memory (EPROM), Electrically Erasable Programmable Read-Only Memory (EEPROM), and/or a Video Random Access Memory (VRAM).

FIG. 7 further shows a power supply 770 such as a battery. The apparatus 700 may also contain a mobile communications unit 780 such as a cellular telecommunications unit, satellite communications unit, positioning unit and/or wireless data networking unit such as a wireless local area networking unit. Apparatus also contains a user interface 790 that typically contains one or more information presentation elements such as a display, speaker, projector and speech synthesizer. The user interface may further comprise one or more user input elements such as a keyboard, touch screen, computer mouse, bar code scanner and speech recognizer.

The apparatus 100 is also suited to multi-tasking i.e. different information may be displayed on the different displays, e.g. navigation and web search.

The apparatus 100 may be conveniently transformed from one mode of operation to another by simply changing the configuration of the apparatus. For instance, the apparatus may be carried in the user's hand as a mobile navigation device. When the destination is reached the user moves the second body from underneath the first, to view a webpage with information about the destination. Once satisfied with the destination the user may move the navigation screen underneath the second and continue to view the website information. The screen concealed beneath a body part may be automatically switched off the save power.

If the apparatus is capable of making phone calls, a call may be made by using the touch display when the touch screen 150 is placed on top of the apparatus (second configuration) or in the extended or third configuration. It is appreciated that either, both or neither of the two body parts may comprise a touch screen.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention. For instance, the apparatus may be configured to provide an intermediate configuration in which the two body parts are angled to facilitate accessing of their user interfaces.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

I claim:

1. A handheld device comprising:
a first body part comprising a first user interface element;
a second body part comprising a second user interface element;
a link mechanism configured to interconnect the first body part and the second body part movably by a user between a first configuration and a second configuration, wherein the link mechanism comprises at each side of the handheld device only one pivot point at each of the first and second body parts;
the first body part and the second body part being stacked in a first order in the first configuration and in a second order opposite to the first order in the second configuration;
wherein the first body part and the second body part are each configured to maintain a parallel orientation when the first body part and the second body part are moved between the first and second configurations;
wherein the first body part and the second body part have been configured to maintain their parallel orientation throughout changing from the first configuration to the second configuration.

2. A handheld device according to claim 1, wherein the first and second body parts each have thickness substantially smaller than width and length.

3. A handheld device according to claim 1, wherein the first and second body parts each have differing widths and lengths.

4. A handheld device according to claim 1, wherein the link mechanism has been configured to provide a third configuration between the first and second configuration such that the first body part and the second body parts are positioned sequentially.

5. A handheld device according to claim 4, wherein the first and second body parts have been located in a common plane in the third configuration.

6. A handheld device according to claim 1, wherein the link mechanism comprises two arms spaced apart of each other.

7. A handheld device according to claim 6, wherein at least one of the arms comprises orientation control equipment configured to control the parallel orientation of the first and second body parts during change between the first and second configuration.

8. A handheld device according to claim 1, wherein the device further comprises orientation control equipment at two opposite sides of the device.

9. A handheld device according to claim 8, wherein the device further comprises a force transmission system configured to link the orientation control equipment at the two opposite sides so as to reduce twist between the two body parts.

10. A handheld device according to claim 1, wherein the link mechanism further comprises a shaft; and gears connecting the shaft to the first and second body parts at the respective pivot points.

11. A handheld device according to claim 1, wherein the device further comprises a processor and a memory configured to store instructions for the processor.

12. A handheld device according to claim 11, wherein the processor has been configured to provide different services according to instructions stored in the memory.

13. A handheld device according to claim 12, wherein the processor has been configured to process different services selectively depending on the configuration of the body parts.

14. A handheld device according to claim 13, wherein the first and second body parts comprise a first display and a second display, respectively.

15. A handheld device according to claim 14, wherein the first and second displays are assigned at a given time to respective first and second services and the processor is configured to select as currently operated service the service corresponding to the display that is stacked on top of the remaining display.

16. A handheld device according to claim 1, wherein the first and second body parts each comprise a first display and a second display, respectively.

17. A handheld device according to claim 16, wherein the device further comprises a processor and a memory configured to store instructions for the processor and the displays have been functionally connected to the processor.

18. A handheld device comprising:
a first body part comprising a first user interface element;
a second body part comprising a second user interface element;
means for interconnecting the first body part and the second body part movably by a user between a first configuration and a second configuration, wherein the means for interconnecting the first body part and the second body part comprises at each side of the handheld device only one pivot point at each of the first and second body parts;
the first body part and the second body part being stacked in a first order in the first configuration and in a second order opposite to the first order in the second configuration;
wherein the first body part and the second body part are each configured to maintain a parallel orientation when the first body part and the second body part are moved between the first and second configurations;
wherein the first body part and the second body part have been configured to maintain their parallel orientation throughout changing from the first configuration to the second configuration.

19. A computer program embodied in a non-transitory physical memory medium for controlling a handheld device that comprises a first body part and a second body part with respective displays and connected such that the first and second body parts are stackable in reversible order, the program comprising:
  computer executable program code configured to cause the handheld device to present first content on the first body part and no content on the second body part when the device is in a first configuration;
  computer executable program code configured to cause the handheld device to present no content on the first body part and second content on the second body part when the device is in a second configuration; and
  computer executable program code configured to cause the handheld device to present third content on the first body part and fourth content on the second body part when the device is in the first configuration;
  wherein the computer executable program code is also configured to cause the handheld device to present content corresponding to maintaining a parallel orientation of the first body part and the second body part when the first body part and the second body part are moved between the first and second configurations;
  wherein the computer executable program code' is also configured to cause the first body part and the second body part to be configured to maintain their parallel orientation throughout changing from the first configuration to the second configuration; and
  wherein the first body part and the second body part are connected by a link mechanism comprising at each side of the handheld device only one pivot point at each of the first body part and the second body part.

20. A computer program according to claim 19, wherein the third content corresponds to the first content and the fourth content corresponds to the second content.

21. A computer program according to claim 19, wherein:
  the first and second contents are independent of each other; and
  the third content and the fourth content collectively represent common content.

* * * * *